United States Patent
Kirkham (10) Patent No.: US 11,690,356 B2
(45) Date of Patent: Jul. 4, 2023

(54) ELASTIC LEASH WITH LENGTH ADJUSTMENT MECHANISM

(71) Applicant: Jeffrey B. Kirkham, Draper, UT (US)

(72) Inventor: Jeffrey B. Kirkham, Draper, UT (US)

(*) Notice: Subject to any disclaimer, the term of this patent is extended or adjusted under 35 U.S.C. 154(b) by 90 days.

(21) Appl. No.: 17/490,471

(22) Filed: Sep. 30, 2021

(65) Prior Publication Data

US 2022/0104461 A1 Apr. 7, 2022

Related U.S. Application Data (60) Provisional application No. 63/086,299, filed on Oct. 1, 2020.

(51) Int. Cl.
*A01K 27/00* (2006.01)

(52) U.S. Cl.
CPC .................... *A01K 27/004* (2013.01)

(58) Field of Classification Search
CPC .... A01K 27/00; A01K 27/003; A01K 27/005; A01K 27/004
See application file for complete search history.

(56) References Cited

U.S. PATENT DOCUMENTS

| | | | | |
|---|---|---|---|---|
| 5,864,927 A | * | 2/1999 | Liu | A01K 27/003 24/163 R |
| 2010/0251971 A1 | * | 10/2010 | Hsieh | A01K 27/005 119/798 |
| 2014/0331944 A1 | * | 11/2014 | Chirico | A01K 15/02 119/797 |
| 2016/0338322 A1 | * | 11/2016 | Letke | A01K 27/003 |
| 2020/0085017 A1 | * | 3/2020 | Gregson | A01K 27/003 |
| 2020/0113155 A1 | * | 4/2020 | Liu | A01K 27/005 |

\* cited by examiner

*Primary Examiner* — Kristen C Hayes
(74) *Attorney, Agent, or Firm* — Workman Nydegger (57) ABSTRACT

A leash is formed with a body composed of an elastomeric material and is configured with several fixed-sized loops and an adjustable loop. The leash includes a buckle connected to one of the fixed-sized loops. The buckle is connected to one of the fixed-sized loops and is slidably engaged with the body so as to cause adjustments in the leash length as the buckle slides along the body responsive to manual forced applied by a user. The buckle is configured to remain at a fixed location on the body absent manual force being applied to slide the buckle along the body. The elastomeric material of the body adds to comfort and safety for using the leash with animal(s) attached to the leash, as well as for increasing secure positioning of the buckle on the body.

13 Claims, 12 Drawing Sheets

ELASTIC LEASH WITH LENGTH ADJUSTMENT MECHANISM

CROSS-REFERENCE TO RELATED APPLICATIONS

This application claims the benefit of and priority to U.S. Provisional Patent Application Ser. No. 63/086,299 filed on Oct. 1, 2020, and entitled "ELASTIC STRAP DOG LEASH WITH LENGTH ADJUSTMENT MECHANISM," which application is expressly incorporated herein by reference in its entirety.

BACKGROUND OF THE INVENTION

There are various types of leashes that have been developed to tether a pet to a user.

Some leashes consist of a simple fixed-length cord or strap with a handle at one end and a fastener at the other end. The fastener is then fastened to a collar of a pet, for example, during use of the leash.

These simple fixed-length leashes can be very restrictive and do not allow for slight variations in the coordinated gait and movements of a pet and their handler without causing abrupt tension forces to be periodically applied to the pet, often around the neck region, such as when the leash is extended to the limit of its fixed length, during deviations in movements of the pet/handler. To alleviate this problem, some users opt to use leashes that are longer, particularly when they are walking their pet outdoors. These leashes enable pets to move in greater distances from their handlers. However, these longer leashes suffer some drawbacks, in that they can become entangled on random objects when the pet and user and walking in such close proximity that there is unused slack in the leash.

Spring loaded recoil systems are another type of leash system that addresses some of the foregoing problems. These types of leashes are beneficial because they allow the pet to deviate from a restricted close proximity to their handler, during which time additional leash can be uncoiled from the recoil housing. Then, when the pet returns to close proximity to the handler, the leash will recoil back into the recoil housing. With such recoil leash systems, pets are enabled to roam variable distances from their handlers without creating too much slack in their leashes at any point in time.

Some recoil leash systems, however, are undesired because they can be relatively expensive and/or bulky, particularly when compared to the simple strap leashes. Additionally, the spring-loaded mechanisms of the recoil leash systems can sometimes fail or act erratically, such that they do not uncoil and/or recoil predictably or smoothly, and such that they suffer from the same problems as the simple leashes (e.g., causing abrupt jerking to the pet's collar and/or resulting in undesired slack that can become entangled). Other such systems require a user to manually activate buttons or levers to trigger the uncoil and recoil mechanisms.

In view of the foregoing, there is an ongoing need and desire for improvements to leash technologies and particularly for leashes that are relatively inexpensive and that enable a user to more predictably control and adjust the length of the leash than is possible with conventional leashes, and particularly for leash systems that are also capable of automatically and dynamically reacting to unpredictable movements of a pet that may cause tension to be applied to the leash and in a manner that is not as uncomfortable for the pet as the simple fixed-length leashes.

BRIEF SUMMARY

Disclosed leashes and leash systems are configured with straps, cables or other body types that are composed elastic or elastomeric materials.

The elastic properties of the disclosed leashes enables them to be dynamically and automatically stretched beyond their original unstretched lengths and in response to the variable tension forces that may be periodically applied to the leashes during use and to retract back to their unstretched lengths, dynamically and automatically, when the tension forces are no longer applied.

In some embodiments, leashes are configured with a body, a plurality of loops formed in the body, a buckle and/or an adjustable collar.

By way of example, some disclosed leashes include a body composed of an elastomeric material that extends between a first terminal end of the body and a second terminal end of the body, wherein the body is configured in such a manner that the leash has a leash length that extends between a first leash end and a second leash end.

Such leash embodiments also include (i) a first fixed-sized loop, the first fixed-sized loop being configured at the first leash end with the first terminal end of the body being unmovably affixed to a portion of the body proximate the first leash end, (ii) an adjustable-sized loop, the adjustable-sized loop being configured at the second leash end with a first portion of the body being slidably engaged with a second portion of the body to form the adjustable-sized loop, a size of the adjustable-sized loop being adjustable when the first portion of the body slides relative to the second portion of the body through, optionally, (iii) an adjustable collar positioned around the first and second portions of the body, the adjustable collar having a length and a shape, the shape of the adjustable collar comprising a substantially hollow sleeve along the length of the adjustable collar through which the first and second portions of the body pass in slidable engagement, (iv) a second fixed-sized loop, the second fixed-sized loop being formed by the second terminal end of the body being unmovably affixed to the body, the second fixed-sized loop being positioned between the first fixed-sized loop at the first leash end and the adjustable-sized loop positioned at the second leash end, (v) a buckle configured for adjusting a semi-fixed length of the leash, as defined as a length of the leash extending between the first end of the leash and the second end of the leash, the buckle having a first end that forms a first hole of the buckle and a second end that forms a second hole of the buckle, the body of the leash passing through the first and second holes of the buckle, the second fixed-sized loop also being affixed to the second end of the buckle with a portion of the body that forms the second fixed-sized loop passing through the second hole of the buckle.

In some embodiments, the buckle further includes a tab that extends away from a top surface of the buckle and forms a third hole of the buckle with the leash body passing through each of the first, second and third holes formed in the buckle in such a manner as to enable the buckle to slide along the body responsive to manual force applied by a user pulling the body through the buckle. In this manner, the configuration of the leash, including the strap and buckle configuration, enables a user to adjust the leash length by holding the buckle while pulling the elongated elastomeric body through the buckle.

The configuration of the leash, including the configured first, second and third holes of the buckle, with the body passing through the buckle, also causes the buckle to frictionally engage the body during use and to prevent the buckle from sliding relative to the body and to prevent the body from sliding through the first, second and third holes without the manual force being applied, and such that the buckle remains in a relatively fixed location on the body along the leash length during use of the leash, the use of the leash being a use when the leash is in a taught configuration with tension being applied to the leash to cause the first and second ends of the leash to be extended or pulled away from each other.

In some embodiments, a fourth hole of the buckle is also formed in the tab, which can be attached to various objects.

In some embodiments, the leash further includes a clasp or other fastener slidably connected to the adjustable-sized loop at the second end of the leash, which can be attached to a collar of a pet, for example.

In some instances, the body of the leash comprises an elastomeric strap having a substantially rectilinear cross-section with a width that is greater than a thickness. The elastomeric material of the strap can include, for example, a thermoplastic elastomer like, but not limited to, polyurea, which enables the leash to stretch/elongate up to 35% or even 40% without permanent deformation.

In some instances, the fixed-sized loops of the leash are fixed by using shrink wrapping to unmovably affixed the first and/or second terminal end(s) of the body to other portions of the body (e.g., the first terminal end being unmovably affixed proximate the first leash end and the second terminal end being unmovably affixed to a portion of the body proximate the buckle).

In some instances, the substantially hollow sleeve of the adjustable collar has a circumference that is sized to cause at least a portion of the substantially hollow sleeve to squeeze the first and second portions of the body together and to squeeze against the first and second portions of the body with a frictional engagement that is sufficient to require a manual force to be applied to the adjustable collar by a user in order to cause the adjustable collar to slide relative to the first and second portions of the body that pass through the substantially hollow sleeve during adjustment of the leash length and such that the adjustable collar will not freely slide relative to the first and second portions of the body without the manual force being applied.

This Summary is provided to introduce a selection of concepts in a simplified form that are further described below in the Detailed Description. This Summary is not intended to identify all of the key features or essential features of the claimed subject matter, nor is it intended to be used to restrict the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail using the accompanying drawings in which.

DETAILED DESCRIPTION OF THE PREFERRED EMBODIMENTS

As disclosed herein, various leashes and leash systems/assemblies are provided, wherein the leashes are composed of elastic or elastomeric material.

In some disclosed embodiments, the leashes are also configured with several fixed-sized loops, an adjustable loop and a buckle that is connected to one of the fixed-sized loops, and in such a configuration to enable the unstretched lengths of the leash to be manually adjusted by a user by sliding the buckle along the body of the leash in response to manual forced applied by the user.

In some instances, the buckle is configured to remain at a fixed location on the body absent manual force being applied to slide the buckle along the body, so as to provide the leash with a user-selected unstretched length during use.

As described and as will be appreciated from the scope of this disclosure, the disclosed leashes are enabled to improve the level of comfort and safety when using the leashes with pet(s), by configurating the leashes with elastic bodies and adjustable mechanisms, to enable users to selectively adjust the lengths of the leashes and to also configuring the leashes with the ability to stretch to avoid applying the same types of jarring forces to pets/handlers that are sometimes applied with conventional leash systems. The simple configurations of the disclosed leashes also enables manufacture of the leashes with less expense and bulk than is possible with some conventional spring-loaded recoil leash systems.

The term leash, as used herein, is not intended to be restricted to a leash for any particular type or size of animal, even though they may be ideally suited for dogs and other similarly sized animals. In particular, it is expected that the disclosed leashes can and will be used with various types of pets (e.g., dogs, cats, sheep, horses, and/or any other animal) of various sizes.

Figure 1:
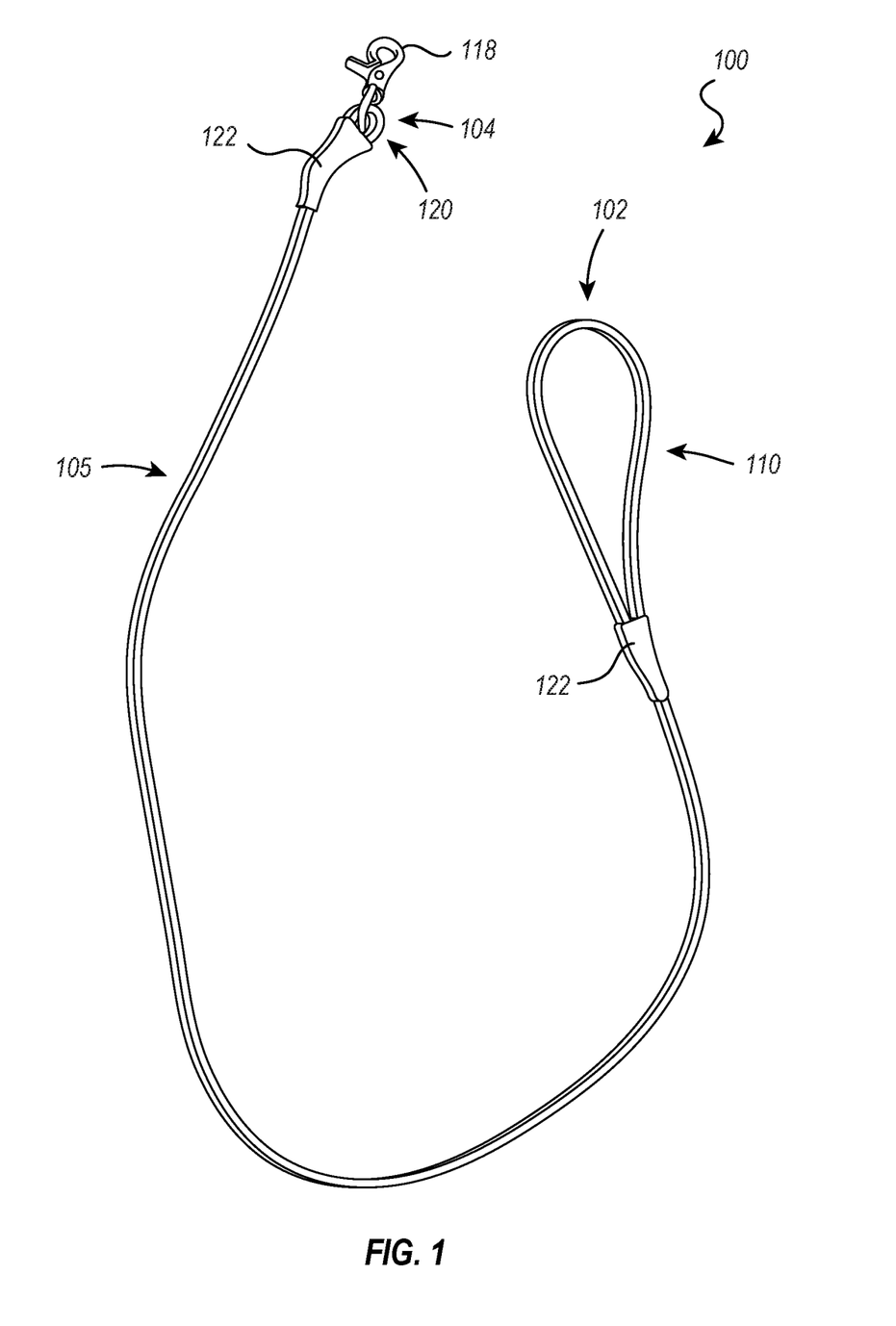
FIG. 1 illustrates a top view an exemplary elastic strap leash having two fixed-sized loops.

FIG. 1 illustrates one embodiment of a leash 100. In this embodiment, the leash 100 includes an elastomeric body 105 (or simply "body"). The leash extends a length between a first end 102 and second end 104.

As shown, the first end 102 includes a first fixed-sized loop 110 that creates a handle for the user. Similarly, the second end 104 includes a second fixed-sized loop 120 that attaches to and/or that is attachable to a clasp or other fastener. In some embodiments, a clasp 118 is affixed to the fixed-sized loop 120, wherein the clasp is configured to attach/detach the clast selectively and manually to a collar of a pet (e.g., a dog collar).

In some embodiments, fixed-sized loops (110 and 120) are formed by affixing terminal ends (not shown) of the body 105 to portions of the body 105 in an unmovable connection, such as with a mechanical fastener (e.g., shrink wrapping 122 that is heated and tightened around the terminal ends and portions of the body 105 where they are positioned). In other instances, the mechanical fastener is a metal or plastic clamp. In other embodiments, first and second terminal ends of the body are unmovably affixed to the body 105 with a chemical fastener, such as an adhesive. In yet other embodiments, the first and second terminal ends of the body are unmovably affixed to the body 105 with a thermal process, such as heated melting/welding of the terminal ends with the body.

The body 105 of the leash 100 may be formed of any kind or type of elastic, elastomeric and/or rubber-like polymer that is capable of being stretched while reforming and/or retaining its original shape after being stretched or manipulated in some manner. For example, the rubber-like polymers of the body 105 include, but are not limited to, any kind of synthetic rubber, polyurea, thermoplastic elastomers, any kind of polyethylene, silicone, latex, and any kind of rubber.

Accordingly, the body 105 may be formed of any kind of material that is suitable for bearing a load, such as a tension force that causes the body to stretch, and that can reform or retain its original shape after the load is removed and/or that will apply a resistive/reforming force for causing the body to return to its original unstretched length while the load is being applied.

In some instances, the body is composed of different materials and layers, such as an inner elastomer (referenced above), and an outer sheath or covering, which may be a woven material. The material may be composed of a synthetic material, such as nylon or polyester, or another synthetic material, and/or a natural material like bamboo, cotton, or another natural material, and/or a blend of synthetic and natural materials. The outer covering can facilitate the stretching and manipulating of the elastomer, particular when in a woven configuration, while protecting the elastomer from abrasive and sharp edges that would otherwise damage the elastomer more easily than the outer covering.

In some embodiments, the dog leash can elongate up to 5%, 10%, 15%, 20%, 25%, 30%, 35%, 40%, 45%, 50% or more than 50% of its original length without permanent deformation, due to the elastomeric properties of the body, depending on the materials and thicknesses of the materials used for the body. The elastomeric properties of the leash are particularly beneficial for allowing the leash to temporarily stretch when the leased animal pulls against the leash, without causing neck trauma to the animal and while still providing a recoiling tension for pulling the animal back into a desired placement relative to the user holding the leash.

Owners of small pets may prefer a leash that can stretch more easily since small pets will apply smaller loads than larger pets. To facilitate further stretching, the elastomer used for the body will be selected to have a greater modulus of elasticity and will also additionally or alternatively, be configured with a cross-section that is thinner and less wide than a leash that is more robust and more difficult to stretch (such as may be appropriate for larger animals).

As mentioned, the elasticity of the leash provides flexibility and recoil. The flexibility and recoil allow a dog to run around without being choked or suffering discomfort. Additionally, the elasticity absorbs the energy from a sudden abrupt forces (e.g., when the user pulls the animal to a stop). Therefore, the elasticity will protect a dog's neck from harmful jarring forces if the dog is suddenly stopped by the leash. This is an improvement over conventional fixed-length leashes.

The length of the body 105 of the dog leash is approximately 1.4 meters (m) long. However, in some embodiments, the length of the body is less than a meter (m), at least 1 m, at least 1.25 m, at least 1.5 m, at least 1.75 m, at least 2 m, at least 5 m, at least 10 m, at least 15 m or more than 15 m, according to various needs or preferences. Accordingly, the body may be any length, and it is not restricted solely to lengths spanning between 1 m and 15 m.

The width of the body 105 of the leash (which may be configured as a rectilinear cross-section) is approximately 1.3 centimeters (cm) wide. However, in some embodiments, the width of the body is less than 1 cm, at least 1.5 cm, at least 2 cm, at least 2.5 cm, at least 5 cm, at least 10 cm or more than 10 cm according to various needs or preferences. Accordingly, the body may be any width, and it is not restricted solely to widths spanning between 1 cm and 10 cm. In some embodiments, the body is at least twice as wide as it is thick. These widths provide adequate structural strength so that the dog leash can bear a load without ripping, permanently deforming or otherwise failing.

The thickness of the body 105 of the leash is approximately 5 millimeters (mm) thick. However, in some embodiments, the thickness of the body is less than 4 mm, at least 4 mm, at least 5 mm, at least 7.5 mm, at least 10 mm or more than 10 mm according to various needs or preferences. Accordingly, the body may be any thickness, and it is not restricted solely to thicknesses spanning between 4 mm and 10 mm. These thicknesses provide adequate structural strength so that the leash can bear a load without ripping, permanently deforming or otherwise failing.

As mentioned, the body 105 may comprise a substantially rectilinear cross-sectional shape, corresponding to a generally planar strap shape. It will be appreciated, however, that the edges of the body do not need to be exactly perpendicular or substantially right-angle edges, as may be provided by some straps/bodies some rectilinear shapes. In fact, the edges may be, alternatively, rounded to any degree or in any manner and such that the cross-sectional shape may be oval or round in some embodiments.

Attention will now be directed to FIG. 2-12, which correspond to different leash configurations, in which the leash(es) 200 are configured with a buckle 250. While there are differences between the leash configurations of leash 100 and 200, it will be appreciated that the properties of the leash bodies (105, 205) may be the same. In particular, the shape, size and material properties of leash 205 may include any configuration/combination of the aforementioned shape(s), size(s) and/or material properties of leash 105.

Figure 2:
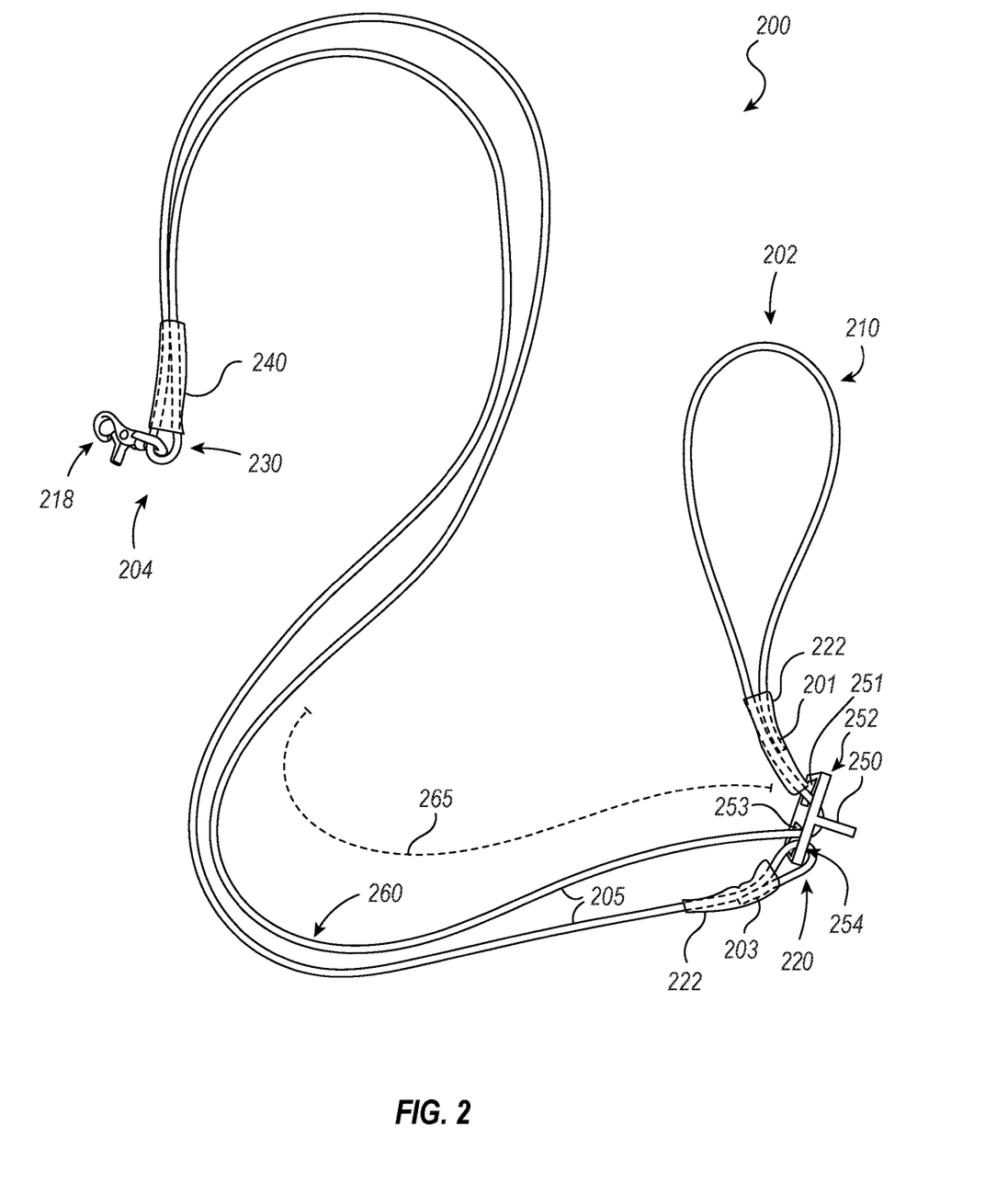
FIGS. 2-7 illustrate an exemplary elastic strap leash having two fixed-sized loops, an adjustable-sized loop, a buckle and an adjustable collar in various views and stages of length adjustment of the leash.

As shown in FIG. 2, the illustrated leash 200 includes a body 200 that is preferably composed of an elastomeric material and that extends between a first terminal end 201 of the body and a second terminal end 203 of the body, wherein the body is configured in such a configuration with various looping that the leash 200 has an overall unstretched leash length that extends between a first leash end 202 and a second leash end 204.

The leash 200 includes a first fixed-sized loop 210, the first fixed-sized loop 210 being configured at the first leash end 202, with the first terminal end 201 of the body being unmovably affixed to a portion of the body proximate the first leash end 210.

The leash 200 also includes an adjustable-sized loop 230, the adjustable-sized loop 230 being configured at the second leash end 204 with a first portion of the body being slidably engaged with a second portion of the body 205 to form the adjustable-sized loop 230, a size of the adjustable-sized loop 230 being adjustable when the first portion of the body 205 slides relative to the second portion of the body 205.

In some embodiments, the leash 200 includes an adjustable collar 240 that is positioned around the first and second portions of the body 205 that slide relative to each other (within the adjustable collar 240) to adjust the size of the adjustable-sized loop 230.

The adjustable collar 240 is configured with a length and a shape. The length of the collar may be any length within a range of several millimeters (e.g., 3-5 mm) to several centimeters (e.g., 5-10 or more). The shape of the adjustable collar comprises a substantially hollow sleeve along the length of the adjustable collar 240 through which the first and second portions of the body 205 pass in slidable engagement.

In some instances, the substantially hollow sleeve of the adjustable collar 240 has a circumference that is sized to cause at least a portion of the substantially hollow sleeve to squeeze the first and second portions of the body 205 together and to squeeze against the first and second portions of the body 205 with a frictional engagement that is sufficient to require a manual force to be applied to the adjustable collar by a user in order to cause the adjustable collar 240 to slide relative to the first and second portions of the body that pass through the substantially hollow sleeve during adjustment of the leash length and such that the adjustable collar will not freely slide relative to the first and second portions of the body 205 without the manual force being applied.

In some instances, the adjustable collar 240 has a diameter that is about the same as the width of the body/strap. In other instances, the adjustable collar 240 has a diameter that is greater than the width of the body 205, but less than double the width of the body 205. In some instances, the adjustable collar 240 is composed of a flexible material that allows it to stretch and/or conform around the two portions of the body that are passing through it.

The leash 200 also includes a second fixed-sized loop 220, the second fixed-sized loop 220 being formed by the second terminal end 203 of the body being unmovably affixed to the body 205.

In some embodiments, the leash 200 further includes a clasp 218 or other fastener slidably connected to the adjustable-sized loop at the second end of the leash, which can be attached to a collar of a pet, for example.

In some embodiments, the first and second terminal ends 201, 203 of the body are unmovably affixed to the body 205 (to form the first and second fixed-sized loops) with a mechanical fastener, such as shrink wrapping 222 that is heated and tightened around the terminal ends (201, 203) and the body 205 where they are positioned. In other instances, the mechanical fastener is a metal or plastic clamp. In other embodiments, first and second terminal ends 201, 203 of the body are unmovably affixed to the body 205 with a chemical fastener, such as an adhesive. In yet other embodiments, the first and second terminal ends 201, 203 of the body are unmovably affixed to the body 205 with a thermal process, such as heated melting/welding of the terminal ends with the body.

As shown, the second fixed-sized loop 220 is positioned between the first fixed-sized loop at the first leash end 202 and the adjustable-sized loop 230 positioned at the second leash end 204.

The leash 200 also includes a buckle 250. The buckle 250 is configured and positioned on the leash body for adjusting the semi-fixed length (e.g., unstretched length) of the leash, which extends between the first end 202 and the second end 204 of the leash.

The buckle 250 includes a first end 252 that forms a first hole 251 of the buckle and a second end 254 that forms a second hole 253 of the buckle. The body 205 of the leash passes through the first and second holes of the buckle 250, as shown.

The second fixed-sized loop 220 is also affixed to the second end 254 of the buckle with a portion of the body that forms the second fixed-sized loop passing through the second hole 253 of the buckle.

Additional views of the buckle 250, which that show how the buckle 250 is attached to the body 250 of the leash 200, are provided in FIGS. 8-12 and the corresponding disclosure describes the functionality and configurations of buckle 250 relative to the other leash components.

The configuration of the leash 200, including the configuration of the buckle 250 and leash body 205, with the body passing through the buckle holes enables the buckle 250 to be manually slid/moved along the body 205 of the leash 200 to expand or shorted the overall length of the leash. This is shown, for example, in the illustrations of FIGS. 2-7, during which the buckle 250 is moved/slid a given length 265, along a portion 260 of the body 205, away from the first end 202 of the leash 200 and towards the second end 204 of the leash 200. This movement causes a lengthening of the leash, as the portion 260 of the body 205 is moved to the other side of the buckle 250, will now be described in more detail.

Figure 3:
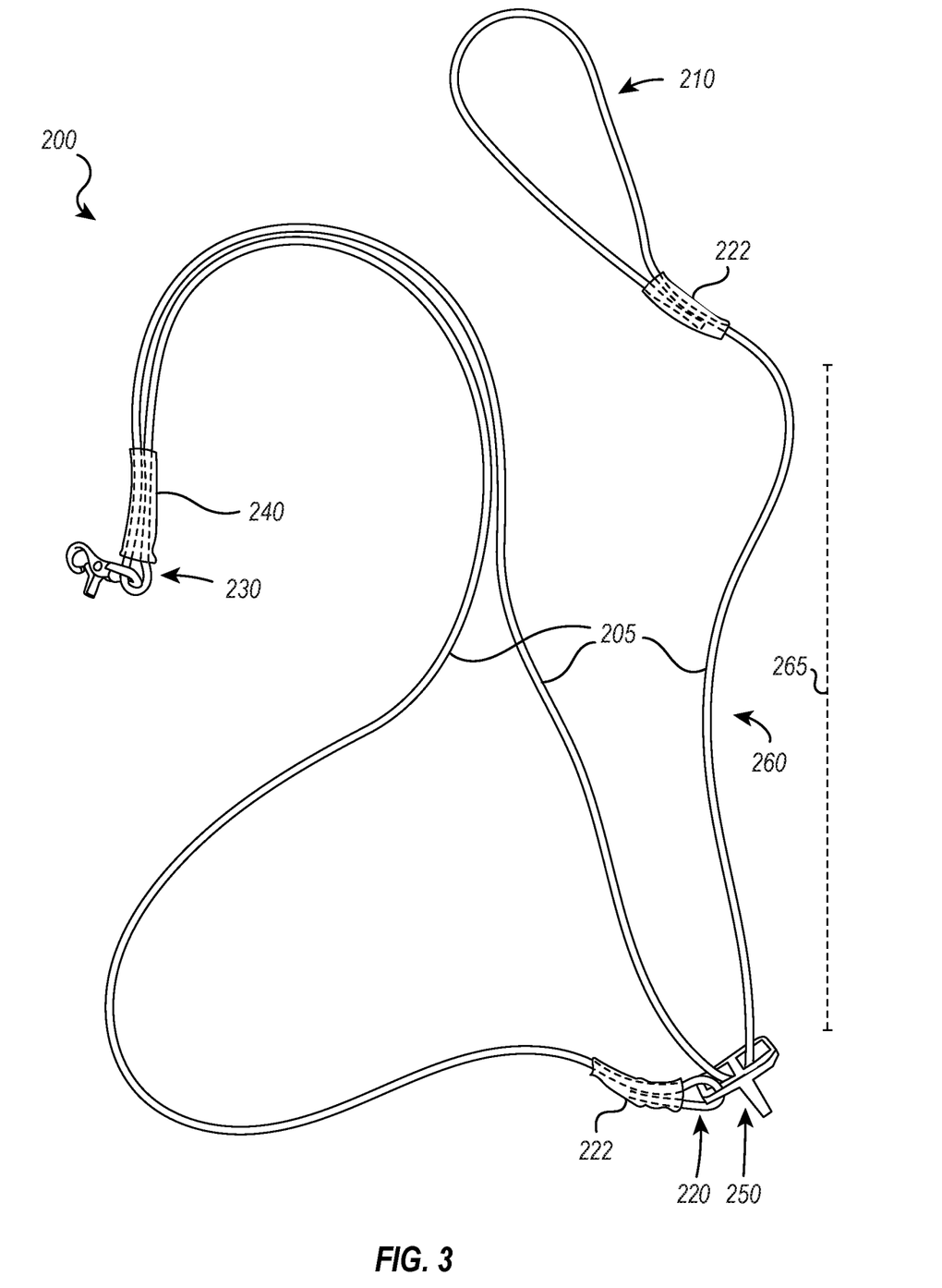

Initially, as shown in FIG. 3, the buckle 250 has moved along the body 205, such that the portion 260 of the body that use to be between the buckle 250 and the second fixed-sized loop 230 is now between the buckle 250 and the first fixed-sized loop 210. As shown, this movement of the buckle 250 has resulted in a bit of even lengths of the two segments of the body 250 positioned between the buckle 250 and the first fixed-sized loop 230.

Figure 4:
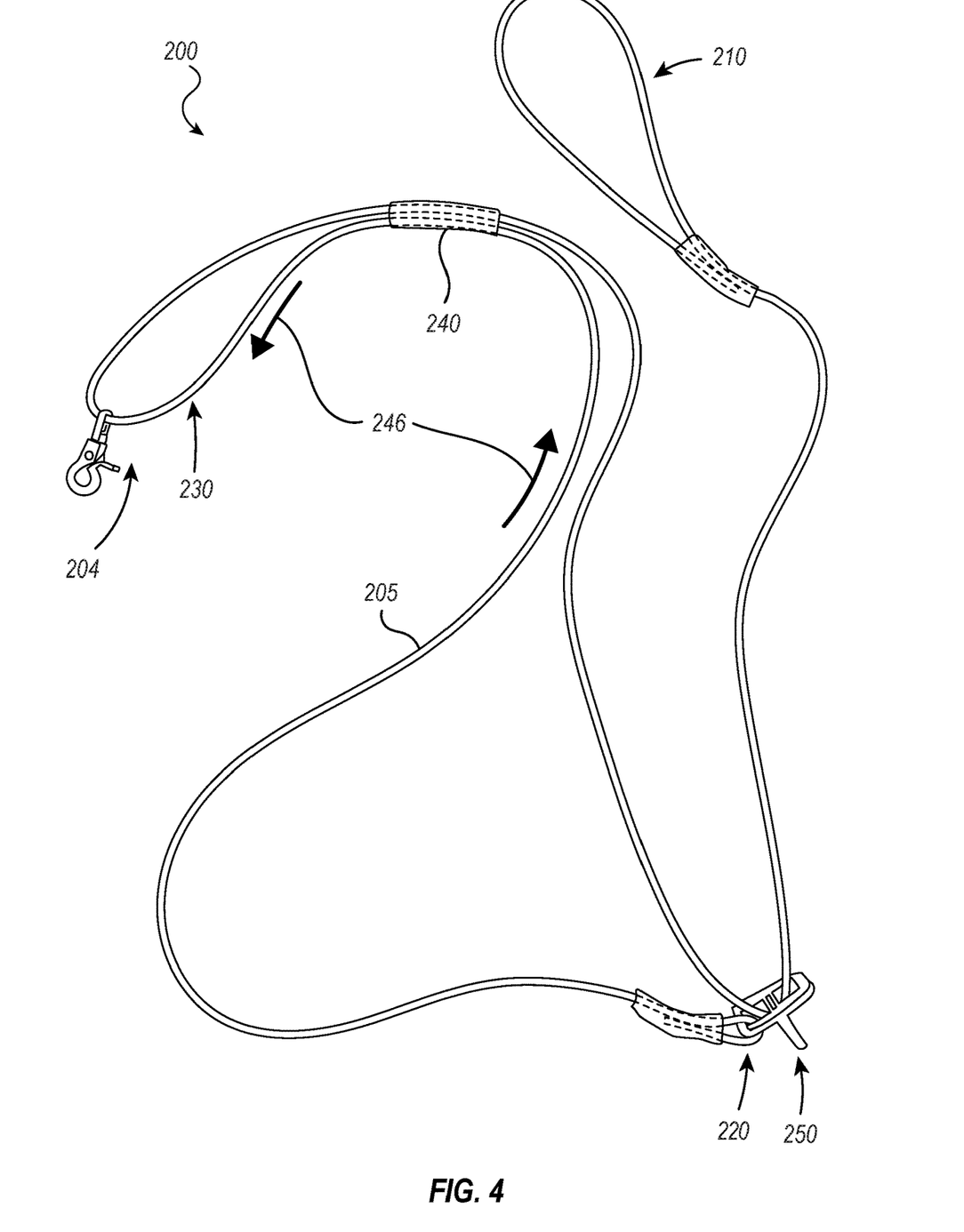
Figure 5:
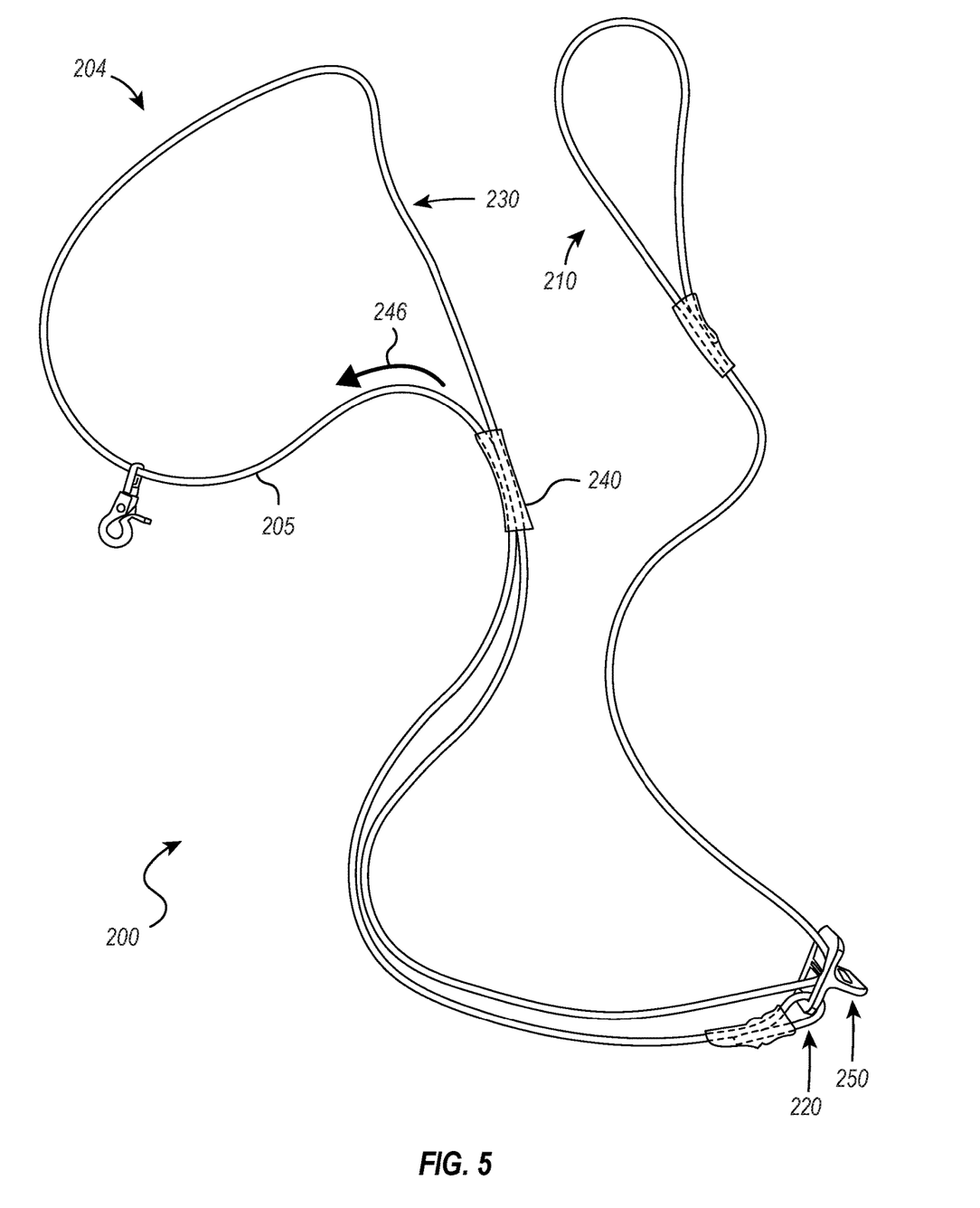

As shown in FIGS. 4 and 5, this unevenness of the body segments can be remedied by pulling one of the segments/portions of the body towards the second end 204 of the leash (in the direction of arrows 246) and thereby expanding/enlarging the adjustable-sized loop 230. When the body 205 of the leash 200 is moved in this manner, it causes a portion of the body to slidably pass through the adjustable collar 240. In some embodiments, this type of movement of the adjustable collar 240 and/or the body through the adjustable collar 240 requires a user to manually pull the adjustable collar 240 down and away from the second end 204 of the leash 200, while pulling on the portion(s) of the body to be pulled out of the adjustable collar 240. This is particularly true when the adjustable collar 240 forms a tight friction fit around the two segments/portions of the body 205 that are in slidable engagement with each other within the adjustable collar 240.

Figure 6:
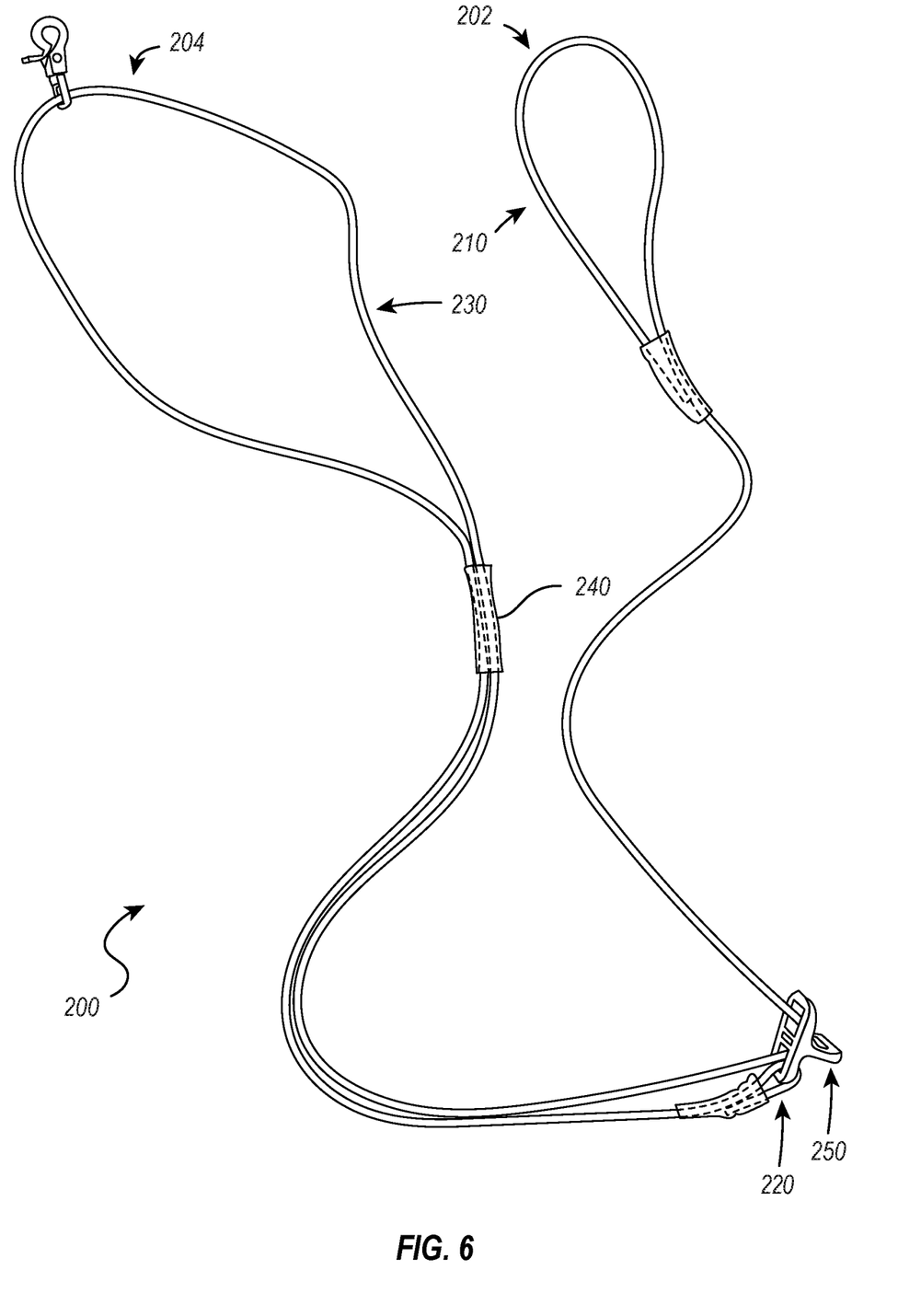
Figure 7:
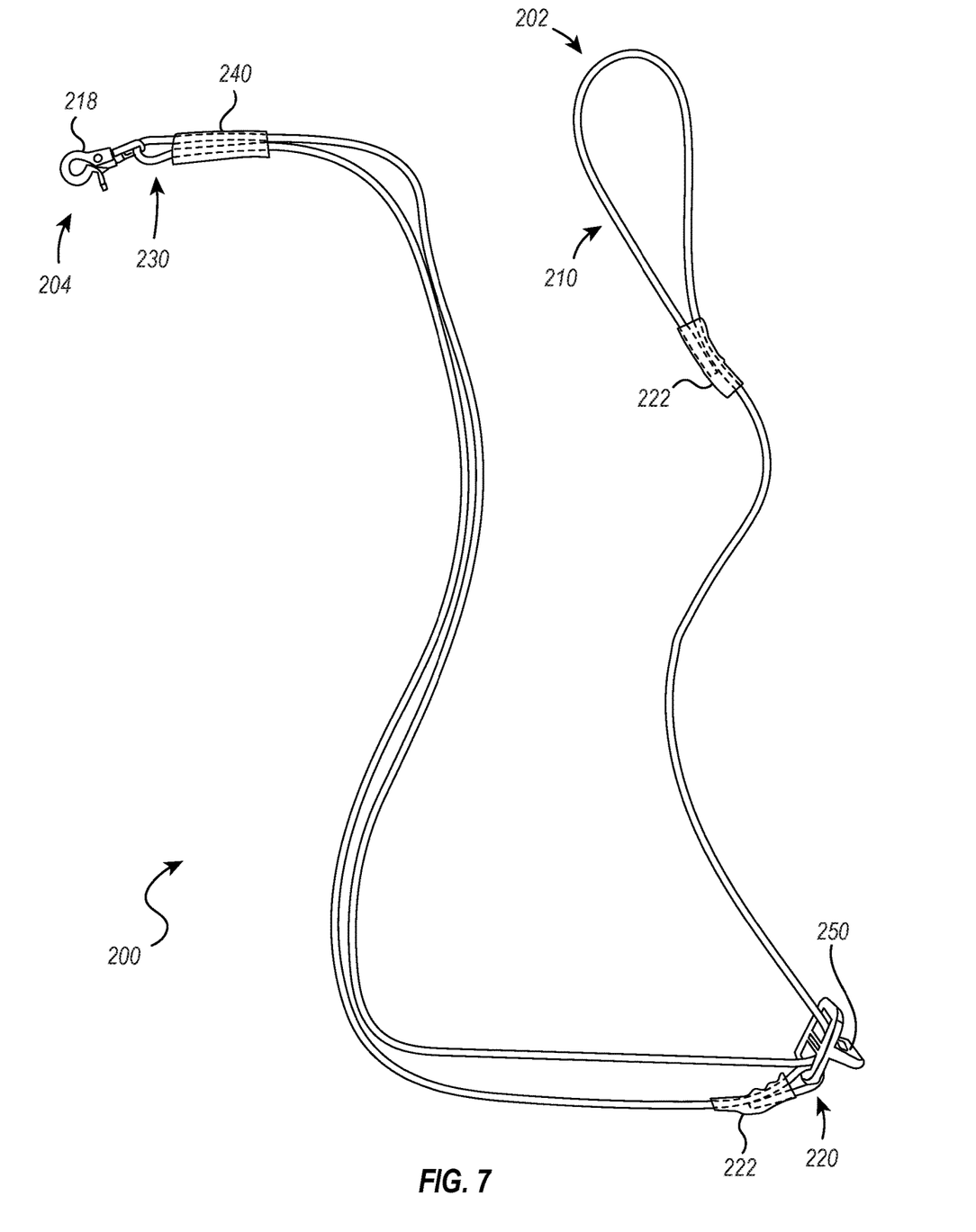

As shown in FIGS. 6 and 7, the size of the adjustable-sized loop 230 can be constricted by moving/sliding the adjustable collar towards the clasp 218 or second end 204 of the leash 200.

The end result of the reconfigurations described in FIGS. 3-7 is that the length of the leash between the buckle 250 and the second end 204 is reduced by half as much as the lengthening or extending of the length between the buckle 250 and the first end 202 of the leash 200.

In this manner, a user can selectively lengthen the leash 200. By performing opposite or opposing movements/reconfigurations, it is also possible to shorten the leash 200, as will be appreciated by those of skill in the art.

To facilitate movement of the buckle 250 along the body 200, the buckle may be configured with a protruding finger hold (e.g., tab 270) that the user can manually grab during movement of the buckle 250 along the body 200. This tab 270 extends up out of a top surface 300 of the buckle 250 (see FIG. 11).

FIGS. 8-12 illustrate various close-up views of the buckle 250 and the various features of the buckle 250 (including the tab 270) and other portions of the leash that are connected with the buckle 250 (e.g., the leash body 205 and fixed-sized loop 220, etc.).

As shown, the buckle 250 includes three main holes (251, 253 and 255). The first hole 251 is disposed at, defined by, and/or formed within the first side 252 of the buckle 250 (passing from the top surface 300 to the bottom surface 350 of the buckle 250). The second hole 253 is disposed at, defined by, and/or formed within the second side 254 of the buckle 250 (passing from the top surface 300 to the bottom surface 350 of the buckle 250). The second fixed-sized loop 220 is also attached to/through the second hole 253 at the second side 254 of the buckle 250.

The third hole is 255 disposed at, defined by, and/or formed within the tab 270 (passing completely through the first side of the tab proximate the first side 252 of the buckle 250 to the second side of the tab proximate the second side 254 of the buckle 250).

As shown, the body 205 of the leash passes through all three of the illustrated holes (251, 253, 255). However, in some alternative configurations in which the buckle omits the tab 270 (not shown), the body 205 of the leash only passes through holes 251 and 253.

Figure 8:
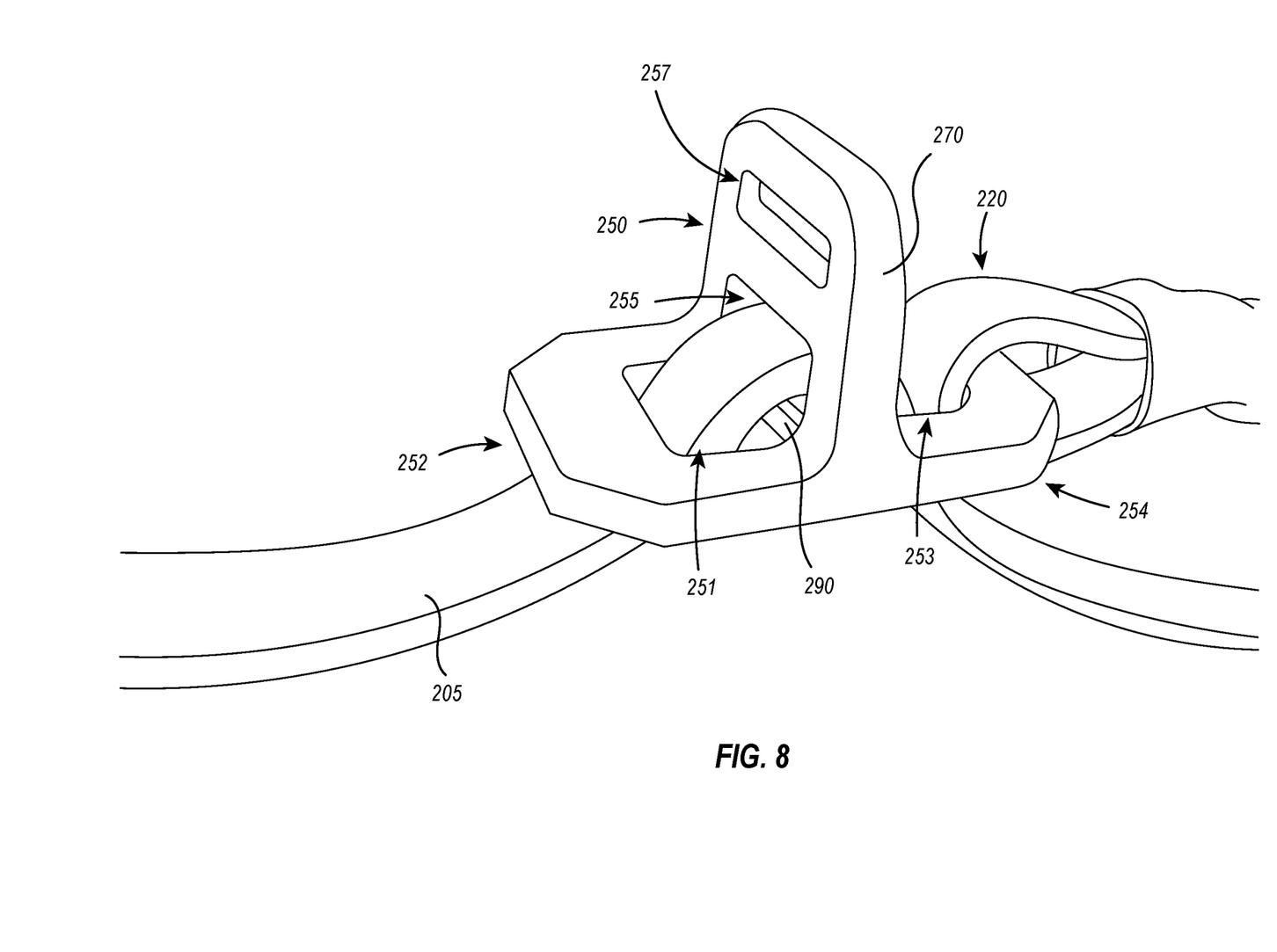
FIGS. 8-12 illustrate an exemplary buckle of the elastic strap leash in various views and configurations with the leash body (e.g., strap) connected with the buckle.
Figure 9:
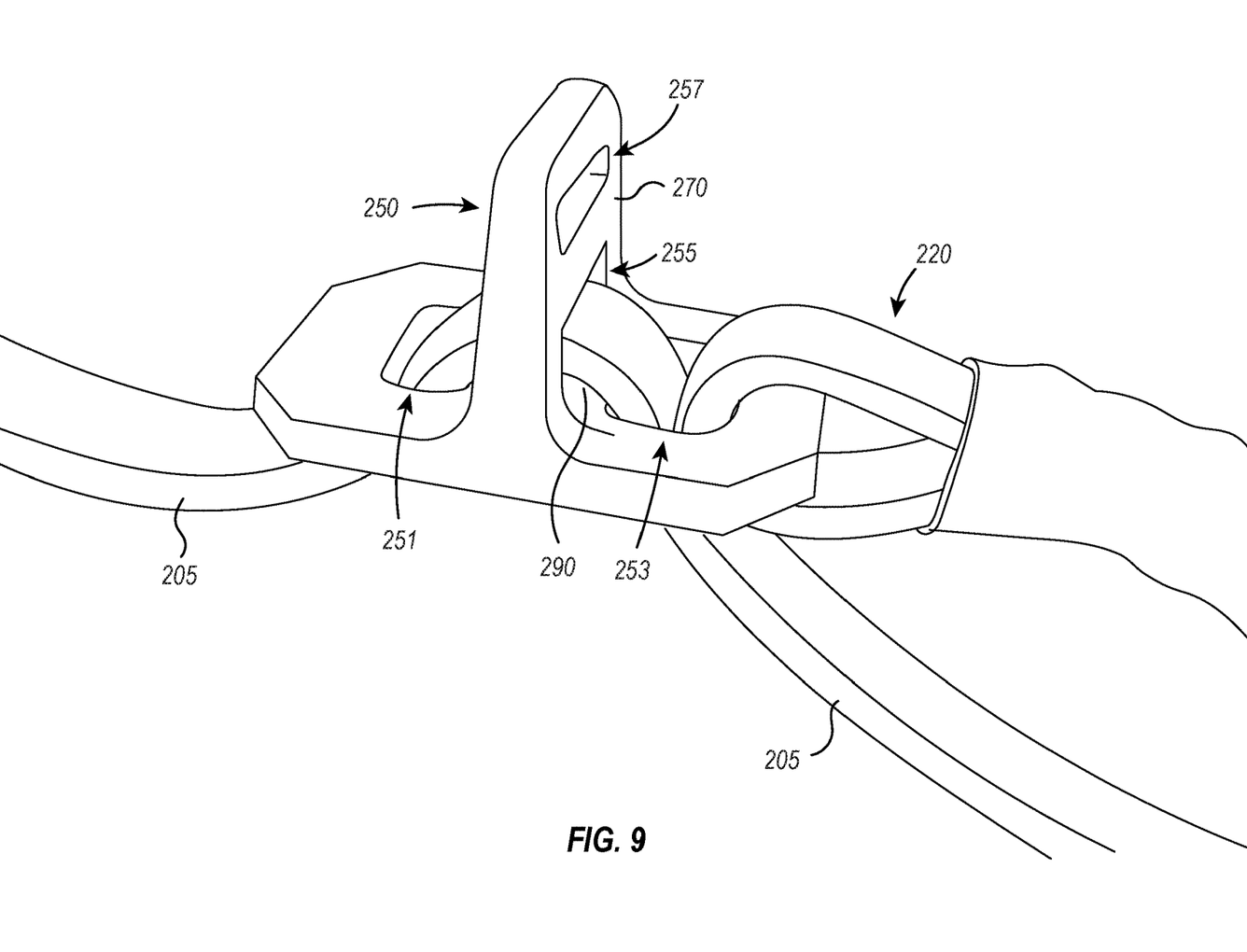
Figure 11:
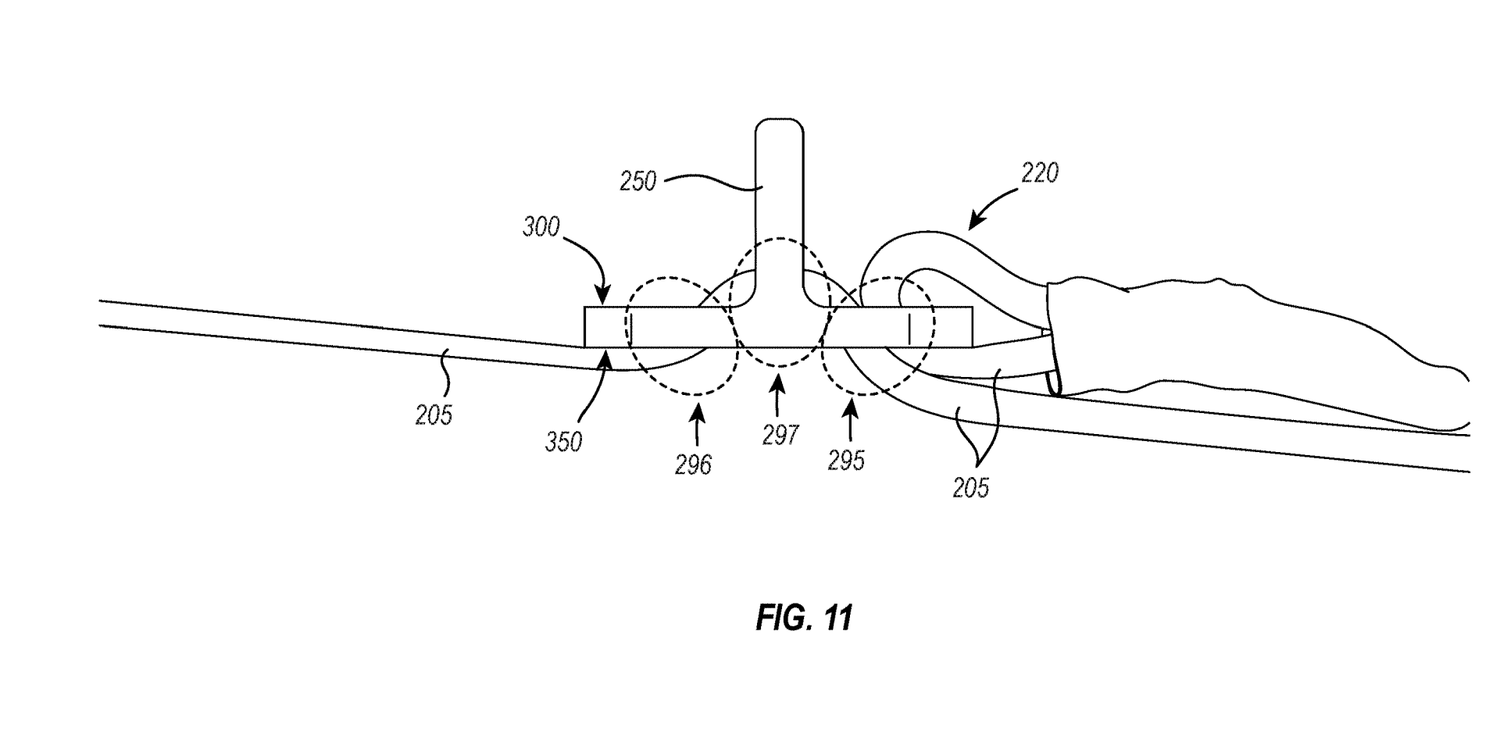

As also shown, the body biases against a bridge or center post portion 290 of the buckle 250 when it passes through the two/three holes and which can help add frictional engagement of the buckle 250 to the body 205 of the leash, particularly when the body 205 of the leash is pulled taught during use (e.g., see the taught configuration in FIG. 11 and even the slightly taught configuration of FIGS. 8 and 9).

Figure 10:
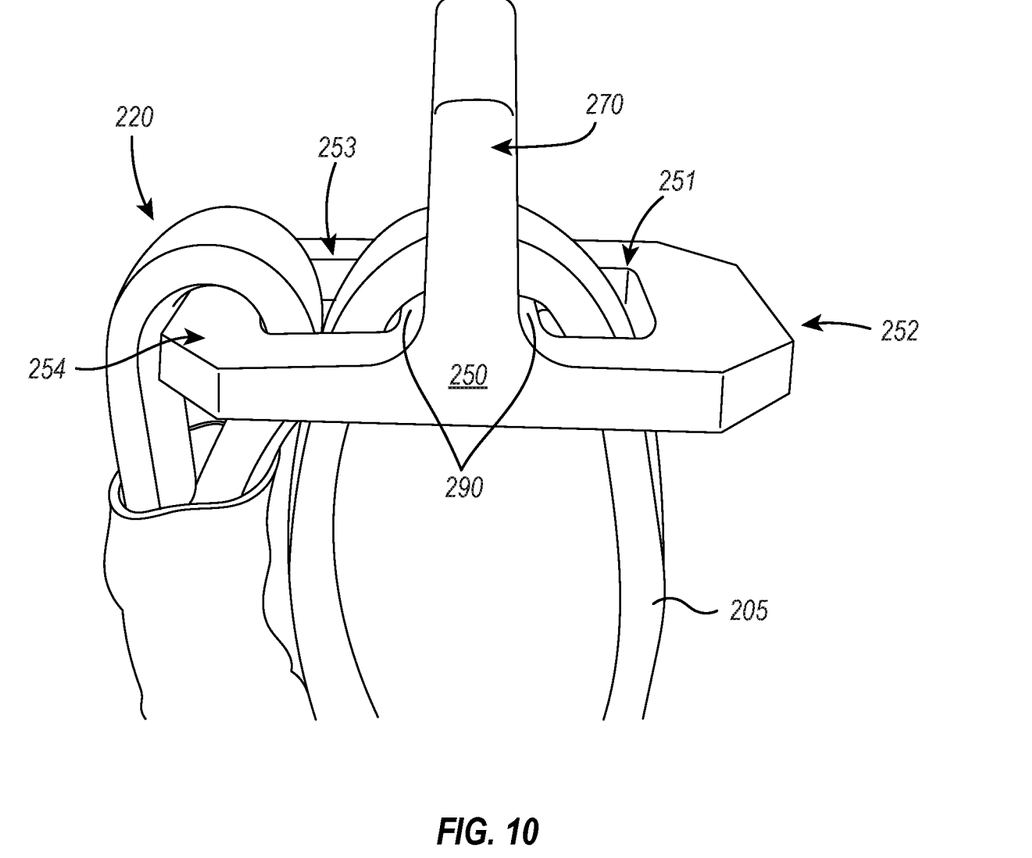

To facilitate movement of the buckle 250 along the body 205, the user can first position the body 205 relative to the buckle 250 in the loose and configuration shown in FIG. 10. In this configuration, for example, it is easier to pull on one portion of the body 205 to cause the body 205 to pass/slide through the holes (251, 253) of the buckle 250.

FIG. 11 illustrates areas 295, 296 and 297 where friction forces caused by biasing/pressing the body 250 against the buckle 250 and/or the body portion of the fixed-sized loop 220 cause the buckle 250 to remain in a fixed position along the body 250, particularly when the leash has the more natural resting and in used configurations shown in FIGS. 8-9 and 11-12.

In some instances, the friction fit or configuration between the body 205 and the buckle 250 can be further enhanced (if desired), by configuring the width of one or more of the holes in the buckle 250 that the body passes through to be approximately the same as the width of the leash body 205 and/or to be narrower than the width of the leash body 205. Notably, when the body 205 has a width wider than a hole that it is passing through, the body will be elastically deformed within the hole 205 and will reform to its original shape outside of the hole, such as, for example, is reflected by dashed line 295 in FIG. 12. If and/or when a hole has a smaller diameter than the body 205 of the leash, it will increase the friction applied to the body 205 by the buckle 250 when the body 205 is pulled through the hole/buckle 250.

Figure 12:
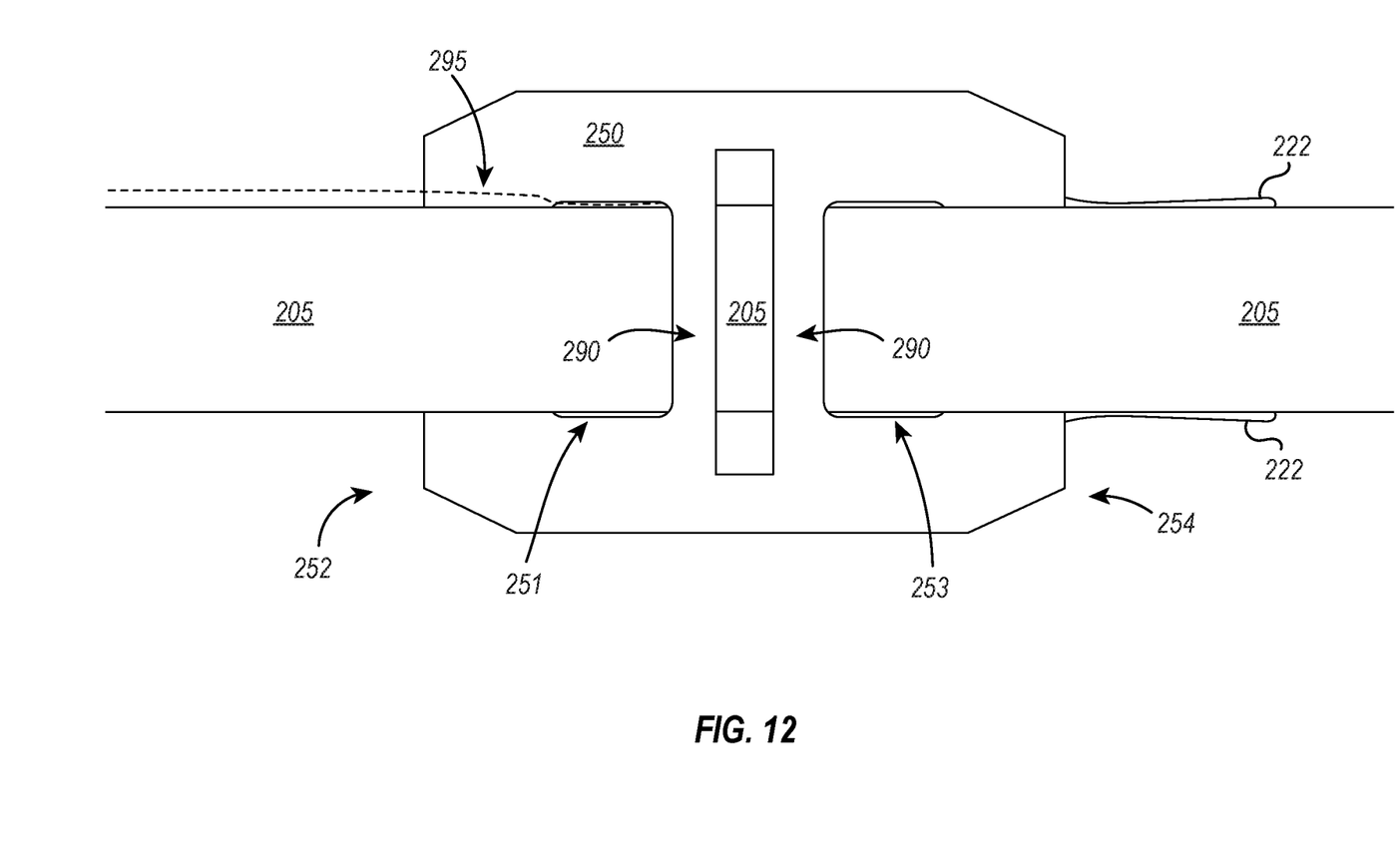

Positioning of the center bridge or center post portion 290 of the buckle 250 can also be spread apart, in one or more portions (as shown in the bottom view of buckle 250 that is illustrated in FIG. 12), to further narrow the cross-sectional area of the hole(s) and/or to increase the compressive/friction applied by the buckle 250 to the body 205 of the leash, when desired.

In some embodiments, not shown, the center bridge or center post portion 290 of the buckle 250 extends up away from the top surface 300 of the buckle 250 into the direction of the tab 270 and such that it extends up past a planar surface (e.g., top surface 300) of the buckle 250 in the direction of the tab. The extension of the center bridge or center post portion 290 of the buckle 250 in this direction can be more than 1 mm, more than 2 mm, more than 3 mm and/or more than 4 mm. This extension is one way to narrow the cross-sectional area of the hole 255 in the tab 270.

In some instances, the tab 270 also includes one or more anchor points and/or holes 257 through which the user may attach or fasten another cord or product (e.g., a poop baggie, or other product).

The length of the buckle 250, between the first and second ends, is approximately 4.5 cm long. However, in some embodiments, the length of the buckle 250 is other lengths, such as less than 4 cm, at least 4 cm, at least 5 cm, at least 6 cm, at least 7 cm, at least 8 cm or more than 8 cm, to accommodate different needs or preferences. Accordingly, buckle 250 may be any length, and it is not restricted solely to lengths spanning between 4 cm and 8 cm.

The width of the buckle 250 is approximately 3 cm wide. However, in some embodiments, the width of the buckle 250 is less than 3 cm, at least 3 cm, at least 3.5 cm, at least 4 cm or more than 4 cm, to accommodate different needs and preferences. Accordingly, the buckle 250 may be any width, and it is not restricted solely to widths spanning between 3 cm and 4 cm.

The thickness of the buckle 250, between the top and bottom surfaces (300, 350) is approximately 4.5 mm thick. However, in some embodiments, the thickness of the buckle is less than 4 mm, at least 4 mm, at least 5 mm, at least 6 mm, at least 7 mm, at least 8 mm or more than 8 mm, to accommodate different needs or preferences. Accordingly, the buckle 250 may be any thickness, and it is not restricted solely to thicknesses spanning between 4 mm and 8 mm.

It should also be noted that the elastic leash can have other uses, such as a tourniquet. For example, the leash can be tied around a body part to create a constrictive tension force. Additionally, the leash's adjustable length allows it to be used as a tie-down strap.

By way of further example, of additional uses, it is noted that the leash can also function as a tie down strap, with the loops being configured to connect to hooks or other objects when fastening the tie down strap and with the elastomeric body providing elastomeric tension when pulling the tie down strap around and/or between the object(s) that are fastened with the tie down strap. Additionally, to change the length of the strap, if desired, the user can slide the buckle to shorten/lengthen the strap as desired to provide the desired amount of tensioning before and/or after fastening the fixed loops to hooks or other anchor points.

The present invention may be embodied in other specific forms without departing from its spirit or characteristics. The described embodiments are to be considered in all respects only as illustrative and not restrictive. Additionally, it will be appreciated that the scope of the invention also includes combinations of the disclosed features that are not explicitly stated, but which are contemplated, and which can include any combination of the disclosed features that are not antithetical to the utility and functionality of the disclosed leashes and leash length adjustment techniques.

The scope of the invention is, therefore, indicated by the appended claims rather than by the foregoing description. All changes which come within the meaning and range of equivalency of the claims are to be embraced within their scope.

What is claimed is:

1. A leash comprising:
a body, the body being composed of an elastomeric material and extending between a first terminal end of the body and a second terminal end of the body, the body being configured such that the leash has a leash length that extends between a first leash end and a second leash end;
a first fixed-sized loop, the first fixed-sized loop being configured at the first leash end with the first terminal end of the body being unmovably affixed to a portion of the body proximate the first leash end;
an adjustable-sized loop, the adjustable-sized loop being configured at the second leash end with a first portion of the body being slidably engaged with a second portion of the body to form the adjustable-sized loop, a size of the adjustable-sized loop being adjustable when the first portion of the body slides relative to the second portion of the body through an adjustable collar positioned around the first and second portions of the body;
the adjustable collar, the adjustable collar having a length and a shape, the shape of the adjustable collar comprising a substantially hollow sleeve along the length of the adjustable collar through which the first and second portions of the body pass in slidable engagement;
a second fixed-sized loop, the second fixed-sized loop being formed by the second terminal end of the body being unmovably affixed to the body, the second fixed-sized loop being positioned between the first fixed-sized loop at the first leash end and the adjustable-sized loop positioned at the second leash end; and
a buckle configured for adjusting a semi-fixed length of the leash, as defined as a length of the leash extending between the first end of the leash and the second end of the leash, the buckle having a first end that forms a first hole of the buckle and a second end that forms a second hole of the buckle, the body of the leash passing through the first and second holes of the buckle, the second fixed-sized loop also being affixed to the second end of the buckle with a portion of the body that forms the second fixed-sized loop passing through the second hole of the buckle.

2. The leash of claim 1, wherein the buckle further includes a tab that extends away from a top surface of the buckle and that forms a third hole of the buckle.

3. The leash of claim 2, wherein the body passes through the first, second and third holes formed in the buckle in such a manner as to enable the buckle to slide along the body responsive to manual force applied by a user pulling the body through the buckle, the first, second and third holes of the buckle being configured on the buckle, with the body passing through the buckle, in such a configuration as to cause the buckle to frictionally engage the body during use and to prevent the buckle from sliding relative to the body and to prevent the body from sliding through the first, second and third holes without the manual force being applied, and such that the buckle remains in a relatively fixed location on the body along the leash length during a use of the leash in which the leash is in a taught configuration with tension being applied to the leash to cause the first and second ends of the leash to be extended or pulled away from each other.

4. The leash of claim 3, wherein a fourth hole of the buckle is formed in the tab.

5. The leash of claim 1, wherein the leash further includes a clasp or other fastener slidably connected to the adjustable-sized loop at the second end of the leash.

6. The leash of claim 1, wherein the body comprises an elastomeric strap having a substantially rectilinear cross-section with a width that is greater than a thickness.

7. The leash of claim 6, wherein the elongated elastomeric material comprises a thermoplastic elastomer.

8. The leash of claim 5, wherein the elongated elastomeric material comprises polyurea.

9. The leash of claim 7, wherein the body is configured to elongate up to 35% without permanent deformation.

10. The leash of claim 9, wherein the body is configured to elongate up to 40% without permanent deformation.

11. The leash of claim 1, wherein a configuration of the leash which is defined by at least the body and buckle of the leash enables a user to adjust the leash length by holding the buckle while pulling the elongated elastomeric body through the buckle.

12. The leash of claim 1, wherein shrink wrapping is used to unmovably affixed the first terminal end of the body to the portion of the body proximate the first leash end and to unmovably affixed the second terminal end of the body to a portion of the body proximate the buckle.

13. The leash of claim 1, wherein the substantially hollow sleeve of the adjustable collar has a circumference that is sized to cause at least a portion of the substantially hollow sleeve to squeeze the first and second portions of the body together and to squeeze against the first and second portions of the body with a frictional engagement that is sufficient to require a manual force to be applied to the adjustable collar by a user in order to cause the adjustable collar to slide relative to the first and second portions of the body that pass through the substantially hollow sleeve during adjustment of the leash length and such that the adjustable collar will not freely slide relative to the first and second portions of the body without the manual force being applied.

* * * * *